Figure 1:
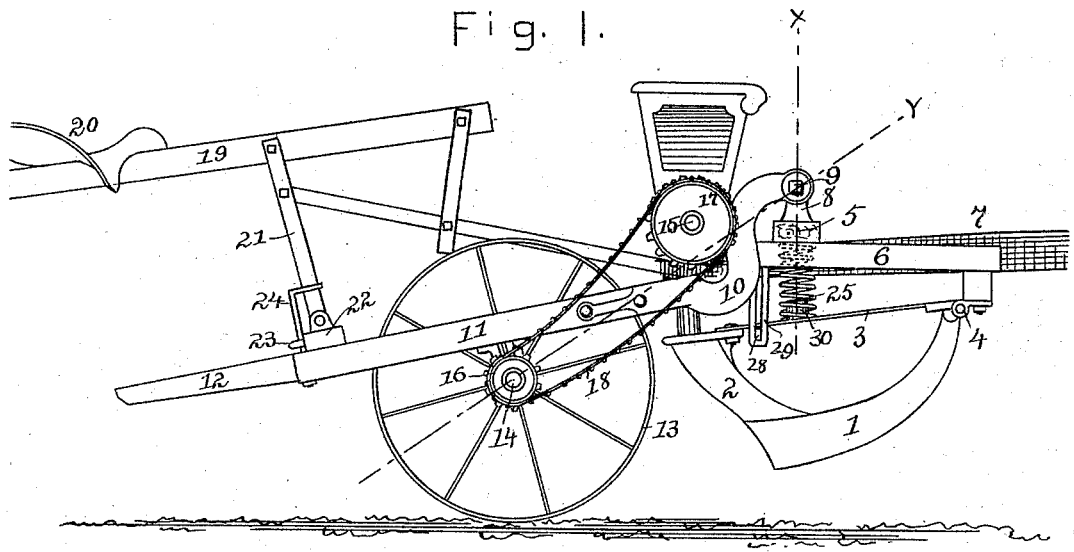

(No Model.)

J. L. ASHURST.
PRESS DRILL.

No. 492,255. Patented Feb. 21, 1893.

Attest
Helen Graham
William Graham

Inventor
John L. Ashurst
by his attorney
L. P. Graham

UNITED STATES PATENT OFFICE.

JOHN L. ASHURST, OF HAVANA, ASSIGNOR TO LEWIS B. ASHURST, OF KILBOURNE, ILLINOIS.

PRESS-DRILL.

SPECIFICATION forming part of Letters Patent No. 492,255, dated February 21, 1893.

Application filed June 27, 1892. Serial No. 438,094. (No model.)

*To all whom it may concern:*

Be it known that I, JOHN L. ASHURST, of Havana, in the county of Mason and State of Illinois, have invented certain new and useful Improvements in Press-Drills, of which the following is a specification.

One feature of this invention relates to drills composed of a front planting frame and a rear wheel frame, and in which the front frame is carried by the rear frame and the tongue when the planting mechanism is raised from the ground. Such feature consists of a rear frame hinged to the front frame at or near the center of weight of the front frame, and the result is that the weight of the front frame is balanced on the lifting connection and the team is made to carry little or no weight.

Another feature relates to drills as above described, and in which the seed dropping mechanism of the planting frame is actuated from the shaft of the wheel frame by means of a chain or its equivalent. This feature consists of a front frame and a rear frame hinged to the front frame at or near the center of weight of the front frame, as in the previously stated case, such hinge being also substantially in line with the axle of the wheel frame and the dropping mechanism of the planting frame, whereby the planting frame may be raised and lowered without materially disturbing the connection of the wheel shaft with the dropping mechanism.

A third feature relates to drills in which the wheel frame is made in sections, the object being to support the driver's seat from all the sections while permitting independent motion in each section, and the peculiarity lies in a seat supporting bar laid loosely across the frames of the sections and guided vertically. I am aware that various devices have been used to equalize the pressure of the weight of the driver on the seat among the different wheels of a grain drill, but so far as I know the result has been to give as much pressure to the wheels in a depression as to those on an elevation. In my device the wheels have sufficient independent motion to properly cover the grain, but there is more force exerted on the elevated wheels than on the lower ones, and consequently the tendency is to break down inequalities of surface and to plant the grain more nearly level.

Another feature of the invention resides in the means employed to impart yielding pressure to the runners of a drill, and this will be developed in the following specific description.

Figure 2:
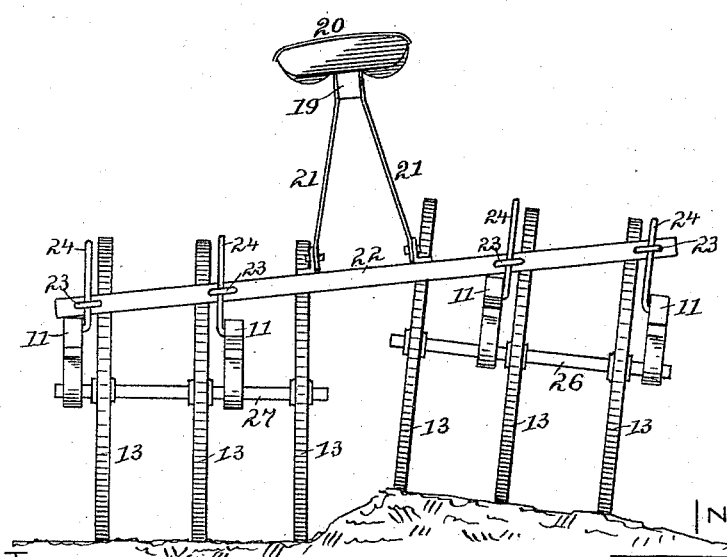

In the drawings forming part of this specification Figure 1 is a side elevation of so much of a drill as is necessary to show the first, second and fourth enumerated features of my invention, and Fig. 2 is a rear elevation of parts necessary to exhibit the third feature.

The runners 1 have boots 2, and such boots are stiffened against lateral deflection by means of bars 3 which are connected with the boots at one end and with the runners or with the front cross bar of the runner frame at the other end. The runners, and preferably the brace bars also, are pivotally connected with the front cross bar of the planting frame as seen at 4. Side bars of the planting frame are shown at 6, and a transverse bar at 5. The tongue is shown at 7. Brackets 8 are carried by cross bar 5 and at their upper ends they form pivotal connections, 9, for curved extensions 10 of wheel frame bars 11. The central bars of the wheel frame extend rearward adjacent to the seat and form foot rests 12. Wheels 13 are arranged on two or more shafts, as 26 and 27 shown in Fig. 2, and such shafts run in brackets secured to bars 11.

The planting shaft is shown at 15, and 17 represents a sprocket wheel on such shaft.

16 represents a sprocket wheel on one of the wheel shafts, and chain 18 connects the sprocket wheel of the wheel shaft with the sprocket wheel of the planting shaft.

The seat 20 is carried on bar 19, and such bar is supported from transverse bar 22 by means of braces 21. The cross bar 22 rests loosely on bars 11, and it has a set of eyes, 23, through which vertical guide rods 24 extend. The guide rods are secured to bars 11, they extend through the eyes and they have hooked ends to prevent the complete disconnection of the cross bar 22. Springs 25 rest on brace bars 3 and bear against cross bar 5 of the front frame. It is their function to yieldingly depress the runners, and on account of their peculiar relation to the brace bars of the runners and the cross bar of the frame it is possible to make them short and strong, to connect and disconnect them easily and to dispense with central guide rods. The form of the brace bars is immaterial, as is also the position of cross bar 5, and it is not impossible to use the springs between the boots of the runners and the bottom of the seed box. The bars 28 extend from side to side of the runner frame under the brace bars, and they are sustained when necessary by links 29. The brace bars 3 and the cross bar 5 have bosses as 30 around which the springs rest, and the relative length of the bosses, the springs and the links is such that when the springs are pressed into position they will not become displaced by the action of the drill in planting.

The line X in Fig. 1 indicates the center of weight of the front frame, and it will be observed that hinge 9 is on that line, and that consequently the front frame is balanced on its support. Line Y is drawn through the wheel shaft and the hinge of the frames and it is apparent that the dropping shaft 15 is alternately above and below such line as the front frame is raised and lowered, and that the swing of the dropping shaft is so nearly concentric with the wheel shaft as to have no effect on the operation of the connecting chain.

In Fig. 2 the wheels are represented as running over very uneven ground and as a result the cross bar 22 is supported by one outer and one inner bar 11. The wheels adjust themselves to the ground, but the pressure is greatest on the highest wheels and the tendency is to bring the planting to a level.

The front frame is raised by tilting the rear frame backward, it is carried entirely by the connection at its center of weight, and consequently the horses have little or no weight to carry.

I am aware that drills and planters have been made in which the draft connection between the two frames has been placed well to the front of the forward frame, but in such cases other connections have been provided for lifting purposes and the weight of the front frame has been pitched forward onto the necks of the horses.

I claim—

1. A seed planter comprising a front planting frame and a rear carrying frame, the two frames being hinged together at or near the center of weight of the front frame, and such hinge constituting the sole lifting and carrying connection for such front frame, substantially as set forth.

2. In seed planters, the combination of a front frame provided with furrow openers, planting mechanism and a tongue, a rear wheel frame adapted to temporarily carry the front frame, and a connection between the shaft of the wheel frame and the planting mechanism of the front frame adapted to impart motion from the shaft to the planting mechanism, the two frames being hinged together at or near the center of weight of the front frame and approximately in line with the power transmitting connection and the front frame being carried by the rear frame solely through such hinged connection.

3. In press drills having the press frame composed of two or more independently acting sections, a seat supporting bar laid loosely across the different wheel frames and held in position by vertical guides.

4. In drills, the combination of a runner frame, runners pivotally connected at their forward ends to the frame and having grain depositing boots at their rear ends, brace bars extending forward from the boots, and springs on the brace bars bearing against the runner frame.

In testimony whereof I sign my name in the presence of two subscribing witnesses.

JOHN L. ASHURST.

Attest:
GEORGE BROOKER,
WILLIAM C. OTT.